United States Patent

Izumi et al.

[11] Patent Number: 6,008,965
[45] Date of Patent: Dec. 28, 1999

[54] DISK DRIVE WITH RECTIFICATION WALL FOR CIRCULATION FILTER AND FILTER UNIT THEREFOR

[75] Inventors: Mitsuhiro Izumi, Kawasaki; Tomoo Sukagawa, Aoba-ku; Takeshi Ohyama, Nagano; Keiji Aruga, Machida; Kazuhiro Suzuki, Kawasaki, all of Japan

[73] Assignee: Fujitsu Limited, Kawasaki, Japan

[21] Appl. No.: 09/039,009

[22] Filed: Mar. 13, 1998

[30] Foreign Application Priority Data

Aug. 27, 1997 [JP] Japan .................................. 9-231453

[51] Int. Cl.⁶ .................................................. G11B 33/14
[52] U.S. Cl. .......................................................... 360/97.03
[58] Field of Search ............................... 360/97.01–98.01

[56] References Cited

U.S. PATENT DOCUMENTS

| | | | |
|---|---|---|---|
| 4,489,356 | 12/1984 | Farmer | 360/97.03 |
| 4,594,626 | 6/1986 | Frangesh | 360/97.02 |
| 4,714,972 | 12/1987 | Biermeier et al. | 360/97.03 |
| 5,025,337 | 6/1991 | Brooks | 360/97.03 |
| 5,034,835 | 7/1991 | Yokoyama | 360/97.02 |
| 5,101,305 | 3/1992 | Ohkita et al. | 360/97.02 |
| 5,140,578 | 8/1992 | Tohkairin | 360/97.02 |
| 5,293,282 | 3/1994 | Squires et al. | 360/97.03 |
| 5,406,431 | 4/1995 | Beecroft | 360/97.02 |
| 5,754,365 | 5/1998 | Beck et al. | 360/97.02 |
| 5,796,557 | 8/1998 | Bagnell et al. | 360/97.03 |
| 5,907,453 | 5/1999 | Wood et al. | 360/97.02 |

*Primary Examiner*—Jefferson Evans
*Attorney, Agent, or Firm*—Greer, Burns & Crain, Ltd.

[57] ABSTRACT

A disk drive includes a casing for enclosing at least a disk and a head. Rectification walls are disposed at corners of the casing. The walls serve to rectify an air stream generated by rotation of the disk at the periphery of the rotating disk. A bypass is defined between the side wall of the casing and at least one rectification wall. A filter is disposed in the bypass for catching dust in the air stream. A parameter d/L, where d is the width of an entrance of the bypass and L is the length of the corner along the periphery of the disk, is determined so that vibration of the rotating disk is equal to or less than an admissible value estimated from a tracking error margin. The tracking error margin is estimated from a track pitch on the disk. Reliable positioning of the head with respect to the disk can be achieved with the present invention.

14 Claims, 8 Drawing Sheets

DISK DRIVE WITH RECTIFICATION WALL FOR CIRCULATION FILTER AND FILTER UNIT THEREFOR

BACKGROUND OF THE INVENTION

1. Field of the Invention

The present invention relates to a disk drive, and in particular, to an airtight recording disk drive including a casing for enclosing a disk and a head with respect to the disk. Such recording disk drive can be represented by a hard disk drive unit (HDD).

2. Description of the Prior Art

The existence of dusts and the like in the casing of an HDD, for example, may disturb the precise read and write operations of a magnetic head in the HDD. In order to avoid this disturbance, the HDD may include a circulation filter within the airtight casing. When a magnetic disk rotates, an air stream occurs at the periphery of the disk in the direction of the rotation. The air stream passes through the circulation filter which may catch dust in the air stream. The circulation filter serves to catch lubricating oil leaking from an actuator for driving the magnetic head, and tiny dust generated from the friction in the driving mechanism.

Still higher recording density is required in HDDs representative of the field of information recording. HDDs are accordingly designed to reduce the pitch of recording tracks. The reduction in the pitch of recording tracks may require further accuracy of the tracking operation of a magnetic head. Accuracy of within $\pm 0.2$ $\mu$m, for example, is in fact required for positioning a magnetic head to a magnetic disk of track pitch of 2.54 $\mu$m, namely, of 10000 tracks per inch.

Vibration of the rotating magnetic disk greatly affects the accuracy of the tracking operation. In recent years, over 70% of errors in positioning a magnetic head are supposedly caused by the vibration of disks. Accordingly, it is becoming more important to reduce the vibration of the rotating disks.

SUMMARY OF THE INVENTION

The present inventors learned from experiments that turbulence generated in the air stream at the outer periphery of the rotating disk promotes the vibration of the disk. The inventors also confirmed that the turbulence in the air stream further increases the vibration of the disk as the rotating velocity of the disk gets faster, reaching 7200 rpm or 10000 rpm for example. The observation by the inventors teaches that the air stream at the outer periphery of the rotating disk should be carefully taken into account when the aforementioned circulation filter is disposed in the casing.

The object of the present invention is accordingly to provide a disk drive capable of restraining or eliminating turbulence in the air stream at the periphery of a disk in rotation so as to reduce the vibration of the disk.

According to a first aspect of the present invention, there is provided a disk drive comprising: at least one disk having a periphery; at least one head with respect to the disk; a casing enclosing the head and disk and having a side wall facing said periphery; a rectification wall disposed at a corner of the casing along the periphery of the disk and defining between the side wall and itself a bypass for air stream generated by rotation of the disk; and a filter disposed in the bypass; wherein a parameter d/L, where d is a width of an entrance of the bypass and L is a length of the corner along the periphery, is determined so that vibration of the disk in rotation is equal to or less than an admissible value estimated from a tracking error margin.

The disk drive of the aforementioned type may include a recording disk such as a magnetic disk and a recording and/or reproducing head such as a magnetic head.

When the disk rotates, an air stream is generated by rotation of the disk at the periphery of the disk. A part of the air stream is introduced in the bypass through the entrance. The filter may catch dust contained in the air stream in the bypass. The rectification wall serves to rectify the air stream at the corner of the casing. The determination of the parameter d/L, which is representative of the relationship between the length of the corner and the width of the entrance, insures sufficient continuity of the rectification wall. Accordingly, the resonant vibration, which is caused by turbulence in the air stream, can be restrained in the rotating disk. Even if the disk vibrates, the positioning error of the head to the disk falls within the allowable error in the tracking operation, so that reliable positioning can be achieved. For example, the tracking error margin of $\pm 0.2$ $\mu$m can be allowed in the tracking operation for a magnetic disk with a track pitch of 2.54 $\mu$m. Assuming that the resonant component of vibration of the disk causes 70% of the error, an admissible value $\alpha$ should be less than 0.28 $\mu$m for the resonant component. Accordingly, the parameter d/L should be set equal toorless than 0.107. The measurement of a $^1\!/_{10}$ reduction period representative of filtering performance of the filter shows that enough filtering performance can be achieved with this value of the parameter d/L. Moreover, according to the result of the experiment, optimal performance can be achieved when the parameter d/L falls in a region between 0.06 and 0.08.

The rectification wall and filter may be assembled as a filter unit before being assembled within the casing. This serves to prevent workers from touching the filter during assembly of the filter. It is accordingly possible to prevent the filter from getting "feathered," in which the surface of the filter material becomes roughened from being touched. In addition, the filter unit can be formed separately from the casing, which is for example formed by an aluminum die cast process. This serves to simplify the shape of the casing so as to facilitate the production of the casing, which leads to the reduction in production cost. Further, the assembly of the filter in a unit may promote the reuse of the filter and/or the support member.

The above-mentioned disk drive can be assembled in a computer, or may be used as an independent external recording apparatus.

According to a second aspect of the present invention, there is provided a disk drive comprising: at least one disk having a periphery; at least one head with respect to the disk; a casing enclosing the disk and head and having a side wall facing the periphery; a rectification wall disposed at a corner of the casing along the periphery of the disk and defining between the side wall and itself a bypass for the air stream generated by a rotation of the disk; and a filter disposed in the bypass; wherein the size of an entrance of said bypass is determined based on vibration of the disk in rotation and filtering performance of the filter. The determination of the size of the entrance enables the control to the resonant component of vibration of the disk in rotation and to the filtering performance of the filter.

According to a third aspect of the present invention, there is provided a disk drive comprising: at least one disk having a periphery; at least one head with respect to the disk; a casing enclosing the disk and head and having a side wall facing said periphery; rectification walls disposed at two or more corners of the casing and spaced from the periphery of the disk so that vibration of the disk in rotation can be restrained. For example, in cases where no filters are disposed, the occupation of the rectification walls at the corners of the casing enables the rectification of the air stream generated along the periphery of the rotating disk in the direction of rotation. The resonant component of vibration of the disk can be reduced to the utmost.

According to a fourth aspect of the present invention, there is provided a filter unit comprising: a support member, which will be disposed at a corner of a casing enclosing at least one disk and at least one head with respect to the disk, having an upper and a lower wall; a rectification wall facing a periphery of the disk when the unit is disposed at the corner of the casing; a bypass defined by the upper and lower walls in cooperation for air stream generated by a rotation of the disk; and a filter placed in the bypass through a filter attachment opening perforated in the upper wall.

With the above filter unit, it is possible to prevent workers from touching the filter during assembly of the filter, so that the filter can be prevented from becoming feathered. In addition, if the filter unit is constructed separately from the casing, which is for example formed by an aluminum die cast process, it is possible to simplify the shape of the casing so as to facilitate the production of the casing. This leads to the reduction in production cost. Further, the assembly of the filter in a unit may promote the reuse of the filter and/or the support member.

If inclined surfaces are formed in the upper and lower walls defining an entrance of the bypass, the inclined surfaces serve to allow the air stream to smoothly flow into the bypass.

Further, the casing may comprise: a casing body forming an interior space; a cover member placed on the casing body for air-tightly closing the interior space; and an elastic member attached to the cover member for providing an elastic force. In this case, the filter unit is fixed between the bottom of the casing body and the cover member by the elastic force from the elastic member when the cover member closes the interior space.

Furthermore, a parameter d/L, where d is a width of an entrance of the bypass and L is a length of the corner along the periphery, may be determined so that vibration of the disk in rotation is equal to or less than an admissible value estimated from a tracking error margin. The tracking error margin may be determined based on a track pitch on the disk. With this structure, enough continuity of the rectification wall can be insured as mentioned above so that the resonant component of vibration due to turbulence in the air stream can be restrained in the disk drive. For example, the tracking error margin of ±0.2 $\mu$m can be allowed in the tracking operation for a magnetic disk with a track pitch of 2.54 $\mu$m. Assuming that the resonant component of vibration of the disk causes 70% of the error, an admissible value $\alpha$ should be less than 0.28 $\mu$m for the resonant component. Accordingly, the parameter d/L should be set equal to or less than 0.107. The measurement of a ⅒ reduction period representative of filtering performance of the filter shows that enough filtering performance can be achieved with this value of the parameter d/L. Moreover, according to the result of the experiment, optimal performance can be achieved when the parameter d/L falls in a region between 0.06 and 0.08.

A disk drive in which the above-mentioned filter unit is assembled can be assembled in a computer, or may be used as an independent external recording apparatus.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
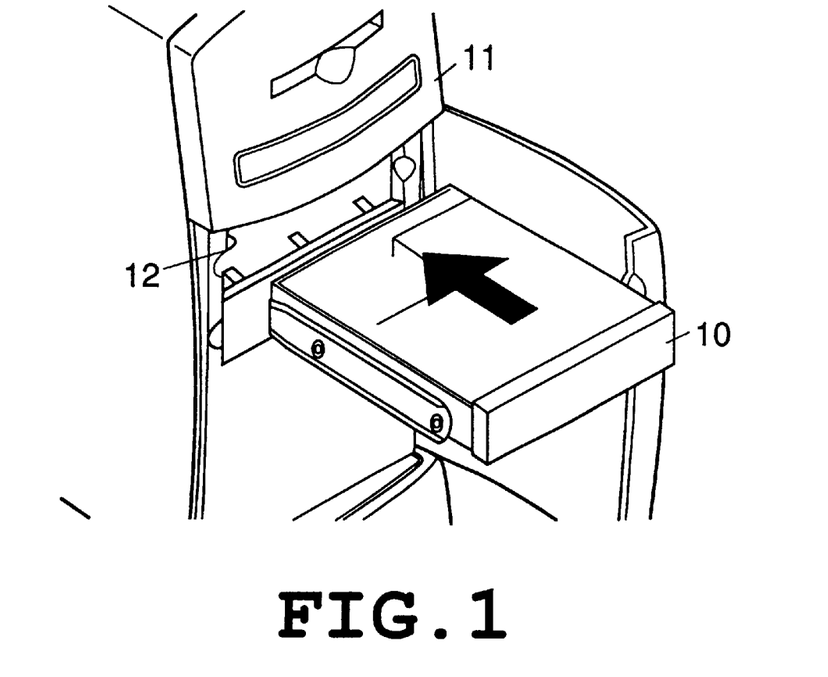
FIG. 1 schematically illustrates an HDD installed in a computer.

FIG. 1 illustrates the appearance of an HDD 10 as a disk drive according to the present invention. The HDD 10 can be installed in a computer 11 such as a workstation. The HDD 10 may initially be assembled in the computer 11, or be installed into the computer 11 after assembly through a slot 12 as shown in FIG. 1. Otherwise, the HDD 10 may be constructed as an independent external recording apparatus.

Figure 2:
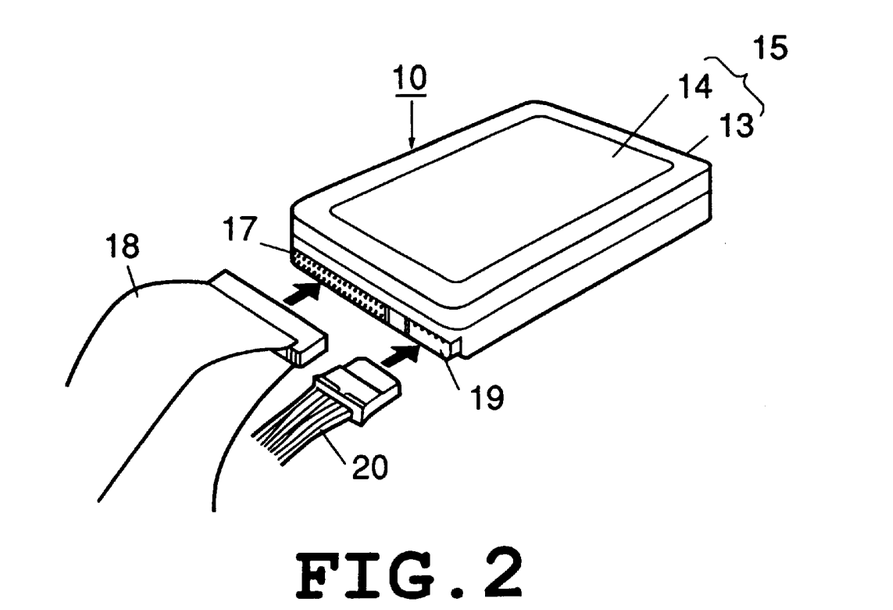
FIG. 2 illustrates a connection of the HDD to the computer.

Referring to FIG. 2, the HDD 10 includes a casing 15 for at least enclosing a magnetic disk and a magnetic head, which are described later. The casing 15 comprises a casing body 13 for providing an interior space, and a cover member 14 for closing the opening of the casing body 13. A substrate, not shown, with a circuit for controlling the HDD 10 thereon is attached to one side of the casing 15. A connector 17 mounted on the substrate is connected to a main board, not shown, of the computer 11 through a cable 18 for providing the control line. A connector 19 mounted on the substrate is likewise connected to a power source, not shown, of the computer 11 through a cable 20 for providing the power supply line.

Figure 3:
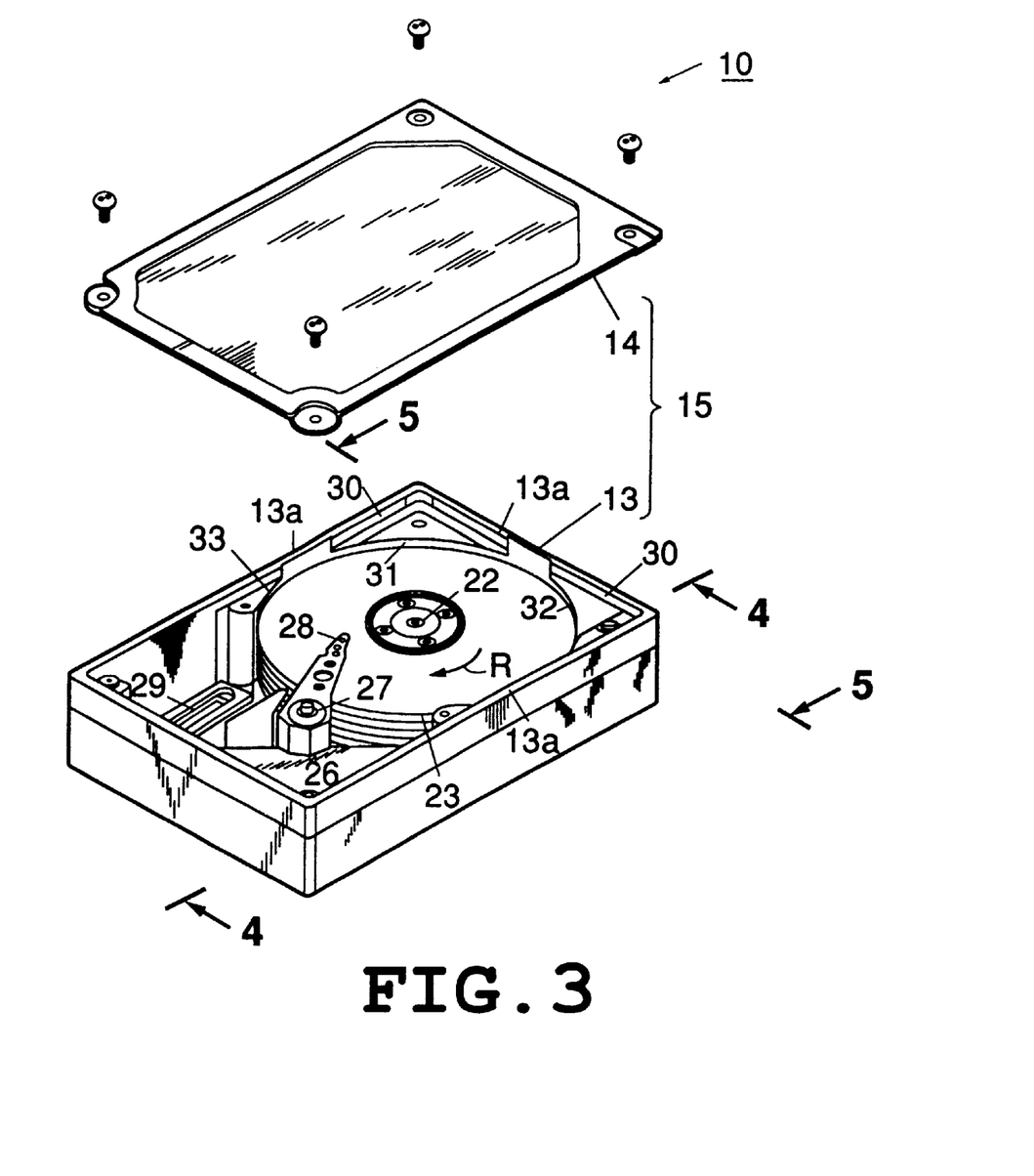
FIG. 3 illustrates an interior structure of the HDD.

FIG. 3 illustrates the interior structure of the HDD 10. A plurality of (ten in this case) 3.5 inch magnetic disks 23 are accommodated in the casing body 13 of the HDD 10 for rotation about a common rotation axis 22. The magnetic disks 23 are equally spaced from one another along the direction of the rotation axis 22. The rotation axis 22 is driven for rotation by a spindle motor, not shown. Magnetic heads 28 are opposed to respective magnetic disks 23. The magnetic heads 28 are driven for swinging movement about a swinging axis 27 by an actuator 26.

The spindle motor, each of the magnetic heads 28 and the actuator 26 are connected to the aforementioned substrate through a connector 29. When the computer 11 intends to read out information data from the magnetic disk 23, a control signal is supplied to the HDD 10 through the connector 17. The magnetic head 28 is controlled on the basis of the supplied control signal for tracking by the actuator 26 and reads out information data from the rotating magnetic disk 23. When the computer 11 intends to write information data into the magnetic disk 23, the magnetic head 28, which is likewise controlled for tracking by the actuator 26 based on the supplied control signal, records information data into the rotating magnetic disk 23.

The magnetic disks 23 are disposed just within three side walls 13a of the casing 15. First and second rectification walls 31, 32 are formed at two corners 30 formed by two of the side walls 13a. The rectification walls 31, 32 extend along the outer periphery of the magnetic disks 23 so as to form a cylindrical shroud 33 surrounding the outer periphery of the magnetic disks 23 by a constantly spaced amount. A set of the magnetic disks 23 is placed within the shroud 33. When the cover member 14 is placed on the casing body 14 in this status, the interior space in the casing body 13 is air-tightly closed. It should be noted that a breathing bore, not shown, can be formed in the casing body 13 for absorbing the variation in inner pressure of the casing 15. A dust filter is in general disposed in the breathing bore for preventing dusts from entering from the outside of the casing 15. When the magnetic disks 23 are driven for rotation by the spindle motor, an air stream is generated in a gap between the outer periphery of the magnetic disks 23 and the inner surface of the shroud 33 along the direction R of the rotation. The gap has a size that is small enough to prevent turbulence in the air stream.

Figure 4:
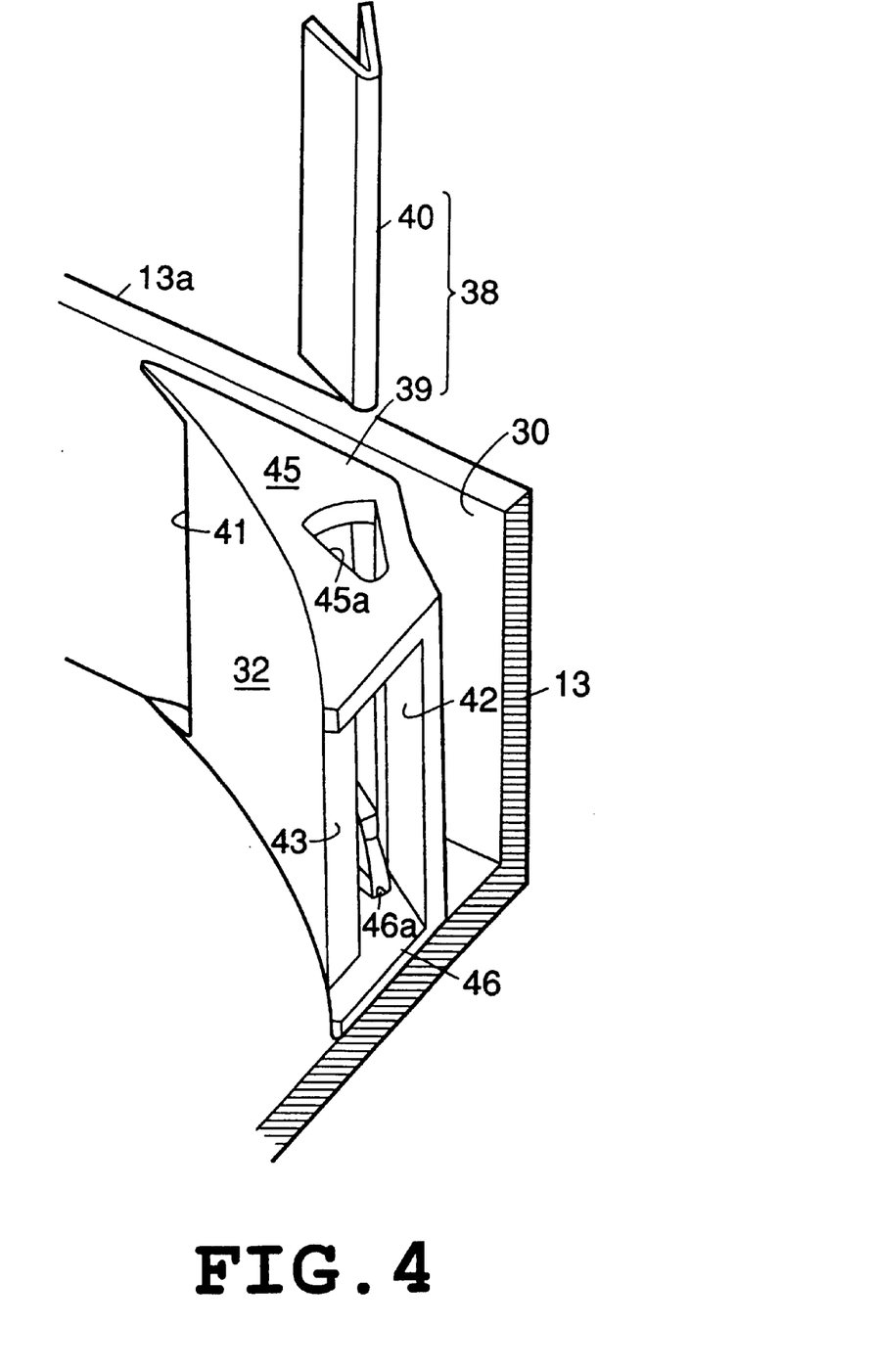
FIG. 4 illustrates a partial enlarged sectional view taken along the line 4—4 in FIG. 3.
Figure 6:
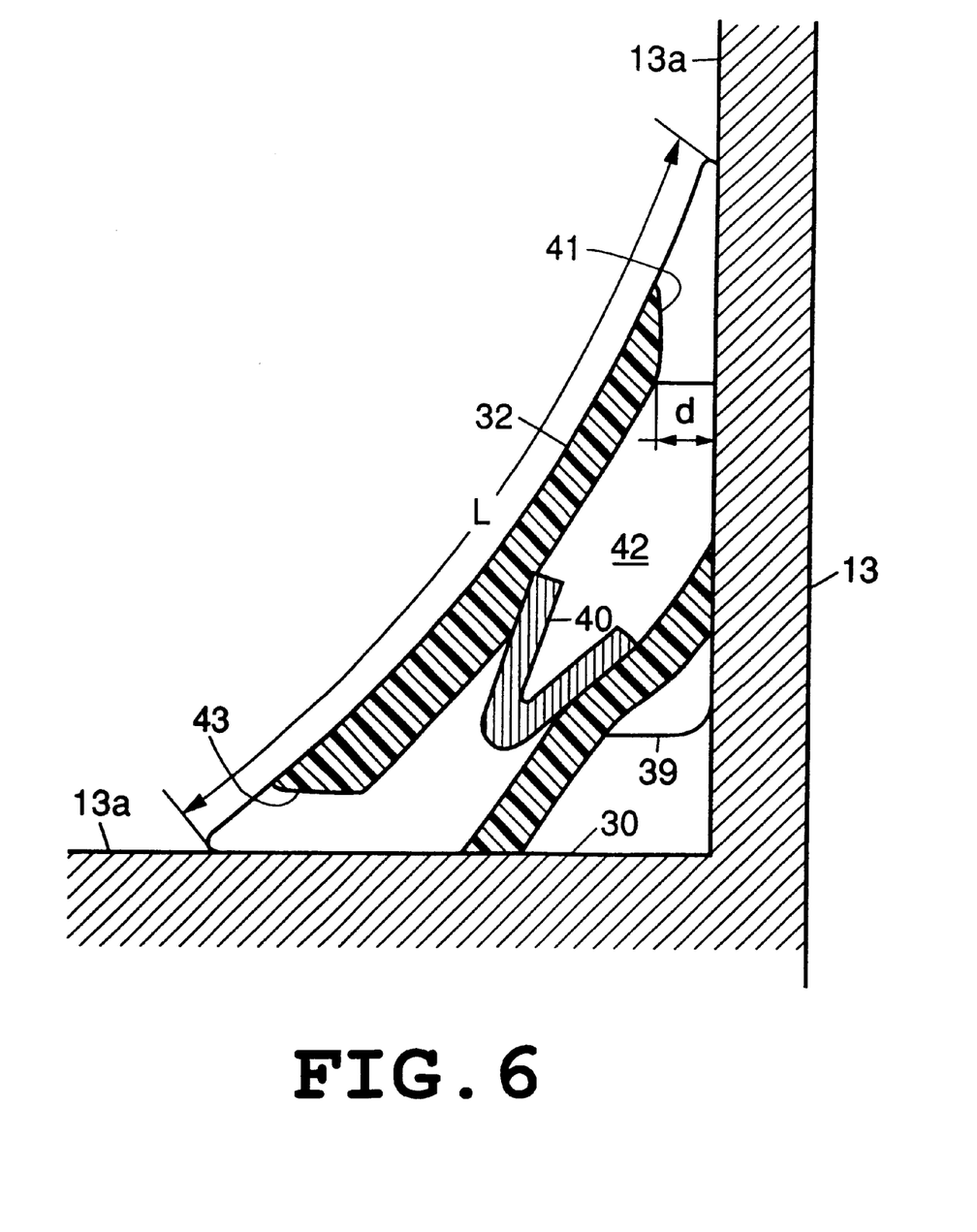
FIG. 6 illustrates an enlarged sectional view of a second rectification wall along a horizontal plane.

Referring to FIG. 4, which illustrates a sectional view along the line 4—4 in FIG. 3, the second rectification wall 32 is formed by a filter unit 38 disposed at the corner 30 of the casing body 13. The filter unit 38 comprises a support member 39 of synthetic resin material including the rectification wall 32, and a circulation filter 40 assembled in the support member 39. The support member 39, as is apparent from FIG. 6, serves to introduce the air stream behind the second rectification wall 32 through an entrance or introduction opening 41, which is formed in the second rectification wall 32, in cooperation with the side wall 13a of the casing body 13. The introduced air stream passes through a bypass or passage 42 in the support member 39 and thereafter returns to the gap between the magnetic disks 23 and the shroud 33 through an exit or discharge opening 43 formed in the second rectification wall 32. The discharge opening 43 is formed by the cooperation of the support member 39 and the side wall 13a of the casing body 13, as shown in FIG. 6.

The passage 42 behind the second rectification wall 32 is defined by upper and lower walls 45, 46 which extend in parallel with the magnetic disks 23. A fan-shaped filter attachment opening 45a is perforated in the upper wall 45 for allowing the circulation filter 40 to be placed in the passage 42. A V-shaped filter fixation opening 46a is perforated in the lower wall 46 for receiving the tip end of the circulation filter 40. The circulation filter 40 of a cloth sheet is folded in a V-shape in cross section, and is thereafter assembled in the support member 39 so as to direct the apex of the V-shape to the downstream of the air stream. Dust in the air stream introduced behind the second rectification wall 32 are accordingly caught in the circulation filter 40, mostly at the apex of the V-shape. The circulation filter 40 may be formed from a fabric sheet of PTFE (polytetrafluoroethylene) for example.

The size of the introduction opening 41 and the discharge opening 43 can be determined based on the amount of the resonant component of vibration for the rotating magnetic disk 23. As the size of the openings 41, 43 gets smaller, in other words, as the continuity of the second rectification wall 32 or shroud 33 increases, turbulence in the air stream at the outer periphery of the magnetic disks 23 can be restrained so that vibration of the magnetic disk 23 can be reduced. On the other hand, less air stream can reach the circulation filter 40 as the size of the introduction opening 41 gets smaller, so that the performance of the circulation filter deteriorates. It is accordingly expected to set the size of the introduction opening 41 large enough to ensure the filtering performance when the circulation filter 40 is placed therein.

Figure 5:
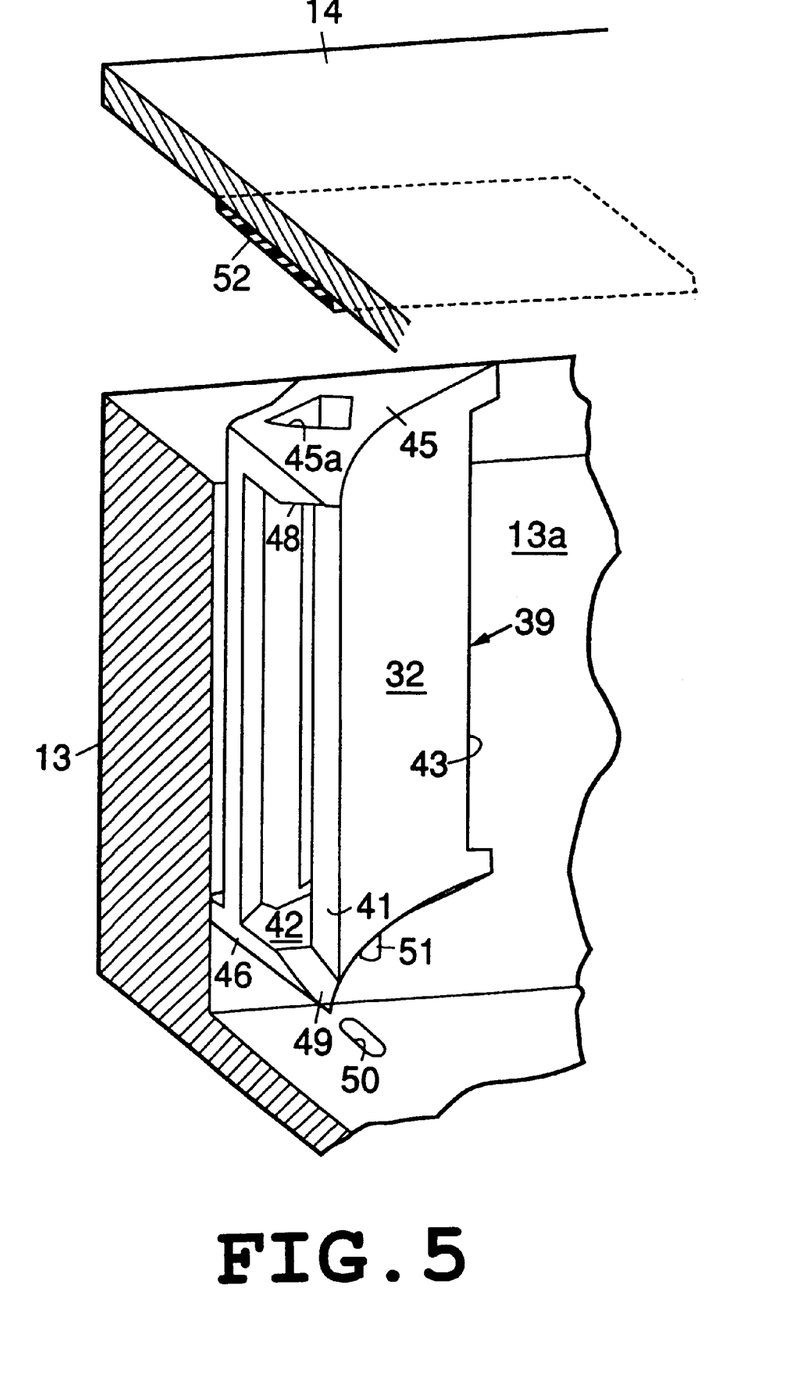
FIG. 5 illustrates a partial enlarged sectional view taken along the line 5—5 in FIG. 3.

As is apparent from FIG. 5, inclined surfaces 48, 49 are formed in the upper and lower walls 45, 46 of the support member 39 so as to extend from the introduction opening 41. The inclined surfaces 48, 49 serve to smoothly introduce the air stream into the passage 42.

A description will now be made of the assembly of the HDD 10. The first step comprises the preparation of the support member 39 formed with an injection mold apparatus and the like, and the V-shaped folded circulation filter 40. The circulation filter 40 is inserted into the filter attachment opening 45a as shown in FIG. 4, and thereafter is pushed in until the tip end of the circulation filter 40 reaches the filter fixation opening 46a. The length of the circulation filter 40 is preferably set to be slightly less than the distance between the upper surface of the upper wall 45 and the lower surface of the lower wall 46. When the circulation filter 40 is completely inserted, it i s fixed between the upper and lower walls 45, 46. The filter unit 38 is assembled in this way.

The assembled filter unit 38 is then assembled in the casing 15 of the HDD 10. The filter unit 38 is placed in the casing body 13 such that a positioning protrusion 51, which is formed at the lower surface of the support member 39, enters a positioning recess 50, which is preformed at the bottom of the casing body 13, as shown in FIG. 5. It is preferable that the filter unit 38 is fixed to the bottom of the casing body 13 with double-faced adhesive tape or the like so as to prevent the filter unit 38 from swaying.

The cover member 14 is then placed to close the opening of the casing body 13. The cover member 14 is fixed to the casing body 13 with screws or the like as shown in FIG. 3. An elastic member 52 that has been attached to the rear surface of the cover member 14, as shown in FIG. 5, elastically receives the filter unit 38. The filter unit 38 is reliably held between the bottom of the casing body 13 and the cover member 14 by the elastic force from the elastic member 52. Accordingly, sealed contact can be established between the cover member 14 and the filter unit 38 while the filter unit 38 is prevented from swaying. The elastic member 52 may be formed of a rubber packing for example.

Since the circulation filter 40 is assembled in a unit as described above, it is possible to prevent workers from touching the circulation filter 40 during assembly, so that the circulation filter 40 is prevented from getting feathued. In addition, the filter unit 38 is formed separately from the casing 15 which is made from aluminum by a die cast process, for example so that the shape of the casing 15 can be simplified to facilitate the die cast process. Thus production cost can be reduced. Further, the assembly of the circulation filter 40 in a unit may promote the reuse of the circulation filter 40 and/or the support member 39.

When the magnetic disks 23 rotate, an air stream is generated at the outer periphery of the disks 23 in the direction of the rotation. Dust existing around the center of the disks 23 move toward the outer periphery of the disks 23 by the centrifugal force of the disks 23, and this dusts gets into the air stream. The air stream containing dust smoothly flows into the passage 42 of the filter unit 38 through the introduction opening 41. Dust in the air stream are caught by the circulation filter 40 in the filter unit 38. The air stream passing through the circulation filter 40 is discharged from the discharge opening 43 and joins with the air stream flowing around the outer periphery of the disks .23. The disposition of the second rectification wall 32 serves to restrain or eliminate turbulence in the air stream at the outer periphery of the disks 23, so that vibration of the disks 23 can be reduced to the utmost. Since air smoothly flows in the passage 42, the performance of the circulation filter can be improved.

Next, a description will be made regarding the determination of the size of the introduction opening 41 while referring to FIGS. 6 and 7. As shown in FIG. 6, the arc length of the recess in the shroud 33 at the corner 30, namely, the length of the corner 30 along the outer periphery of the disks 23 is referred to as L (=37.5 mm). Ten 3.5 inch magnetic disks 23 are accommodated in the casing 15. The disks 23 rotate at a velocity of 7200 rpm. The circulation filter 40, for example, is formed from PTFE having a nominal filtering coefficient of 65% to particles of 0.3 $\mu$m diameter, and a nominal pressure loss of less than 1.9 mmH$_2$O to an air stream of 5.3 cm/sec. The width d of introduction opening 41 is varied to obtain runouts (resonant component of vibration of disk) and purge times ($\frac{1}{10}$ reduction period) in this condition. The width d is measured in the direction perpendicular to the side wall 13a. The term "$\frac{1}{10}$ reduction period" means a period of time taken to reduce the amount of particles having the diameter of 0.3 $\mu$m in the air stream to $\frac{1}{10}$ of the original level. It should be noted that the size of the discharge opening 43 is set at the same dimension as the introduction opening 41.

Figure 7:
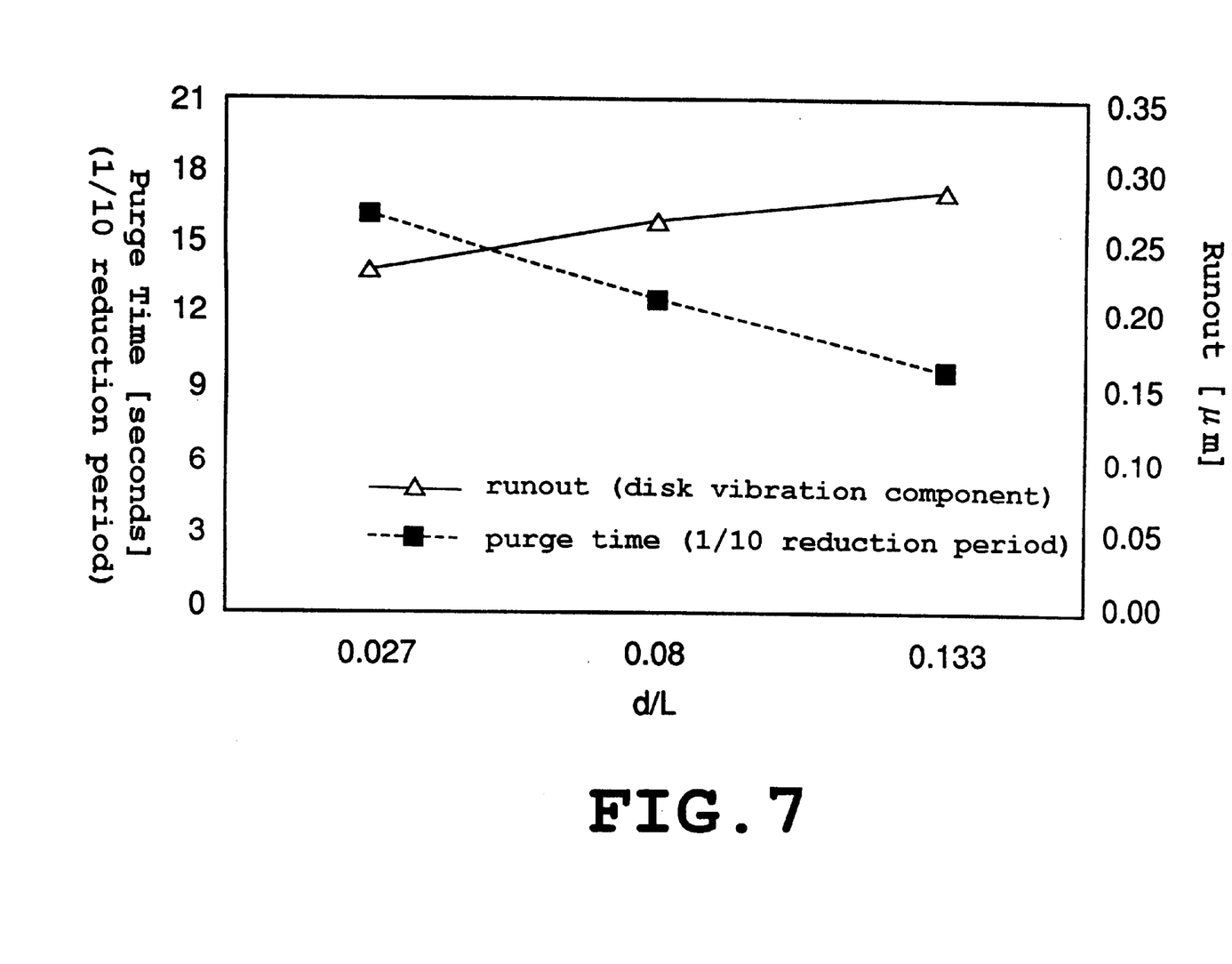
FIG. 7 illustrates a graph showing the variation in runout and purge time to the width of an introduction opening.

As is apparent from FIG. 7, the runout of 0.29 $\mu$m at d=5 mm (d/L=0.133) reduces to 0.27 $\mu$m at d=3 mm (d/L=0.08), and to 0.23 $\mu$m at d=1 mm (d/L=0.027). For example, an error within 0.2 $\mu$m (this is referred to as "tracking error margin") can be allowed in the tracking operation of the magnetic head 28 for the disks 23 having track pitches of 10000 TPI. Supposing that the resonant component of vibration of disk 23 causes 70% of maximum amplitude of 0.4 $\mu$m in the allowable error, the admissible value $\alpha$ of the resonant component of vibration of disk 23 can be set at 0.28 $\mu$m. Accordingly, it can be read from FIG. 7 that the parameter d/L is preferably equal to or less than 0.107 (d=4 mm).

On the other hand, the purge time of 10 seconds at d=5 mm increases to 12.8 seconds at d=3 mm, and to 16.3 seconds at d=1 mm. The purge time should be set at less than 20 seconds in view of the effect of dust upon the read/write performance of the magnetic head 28. Supposing that the purge time is reversely proportional to the parameter d/L, it be preferable that the parameter d/L is equal to or greater than 0.01. Accordingly, enough filtering performance can be obtained at d/L equal to or greater than 0.107. The experiment also reveals that the parameter d/L should preferably be between 0.06 and 0.08. It should be noted that the height of the introduction opening 41 and the discharge opening 43 in the vertical direction depends on the thickness of the disks 23 and the number of disks 23 accommodated in the casing 15. It is confirmed that turbulence can be restrained or reduced more as the height gets larger.

Figure 8:
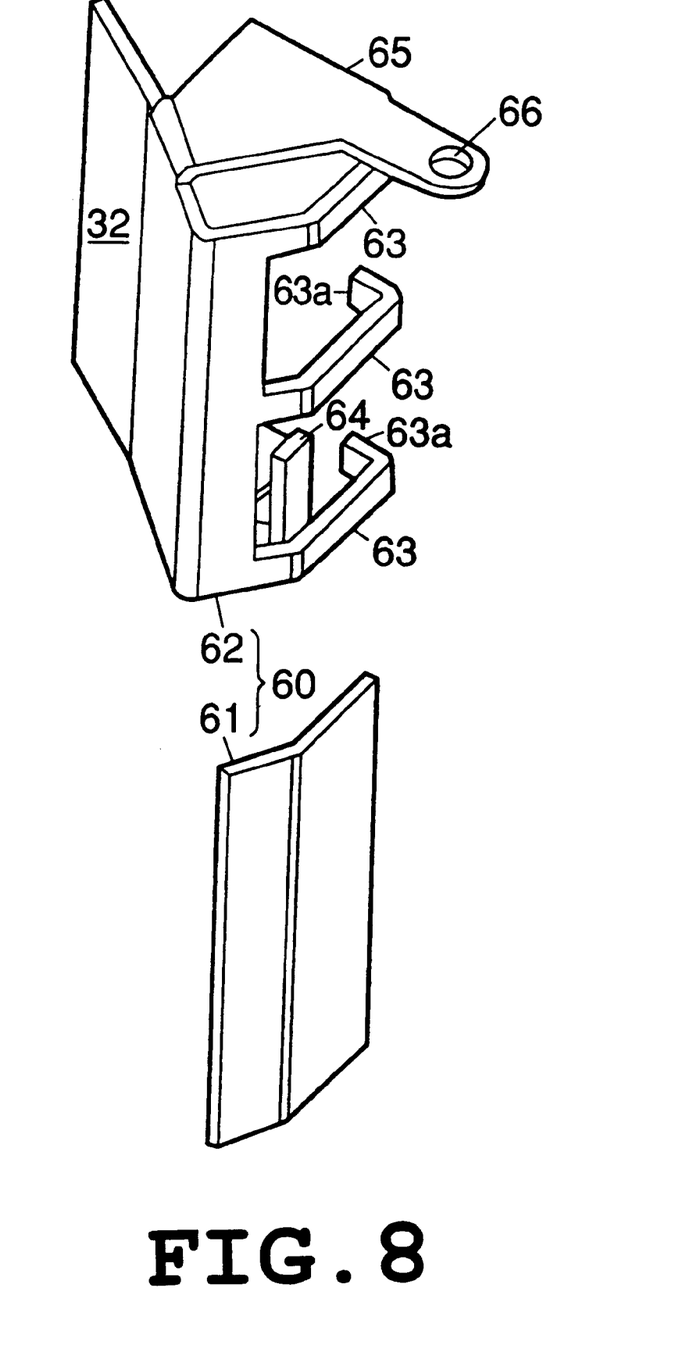
FIG. 8 illustrates the appearance of another embodiment of a filter unit.

FIG. 8 illustrates another embodiment of a filter unit of the present invention. The filter unit 60 is characterized in that the support member 62 of the circulation filter 61 is punched out of a metal plate. As is apparent from FIG. 8, the support member 62 comprises three arms 63 that are each erehorizontally extending toward the side wall 13a at the corner 30 from one end of the rectification wall 32. The circulation filter 61 of a cloth material is placed inside the arms 63. Hooks 63a at the tip ends of the arms 63 serve to hold a side of the circulation filter 61.

Figure 9:
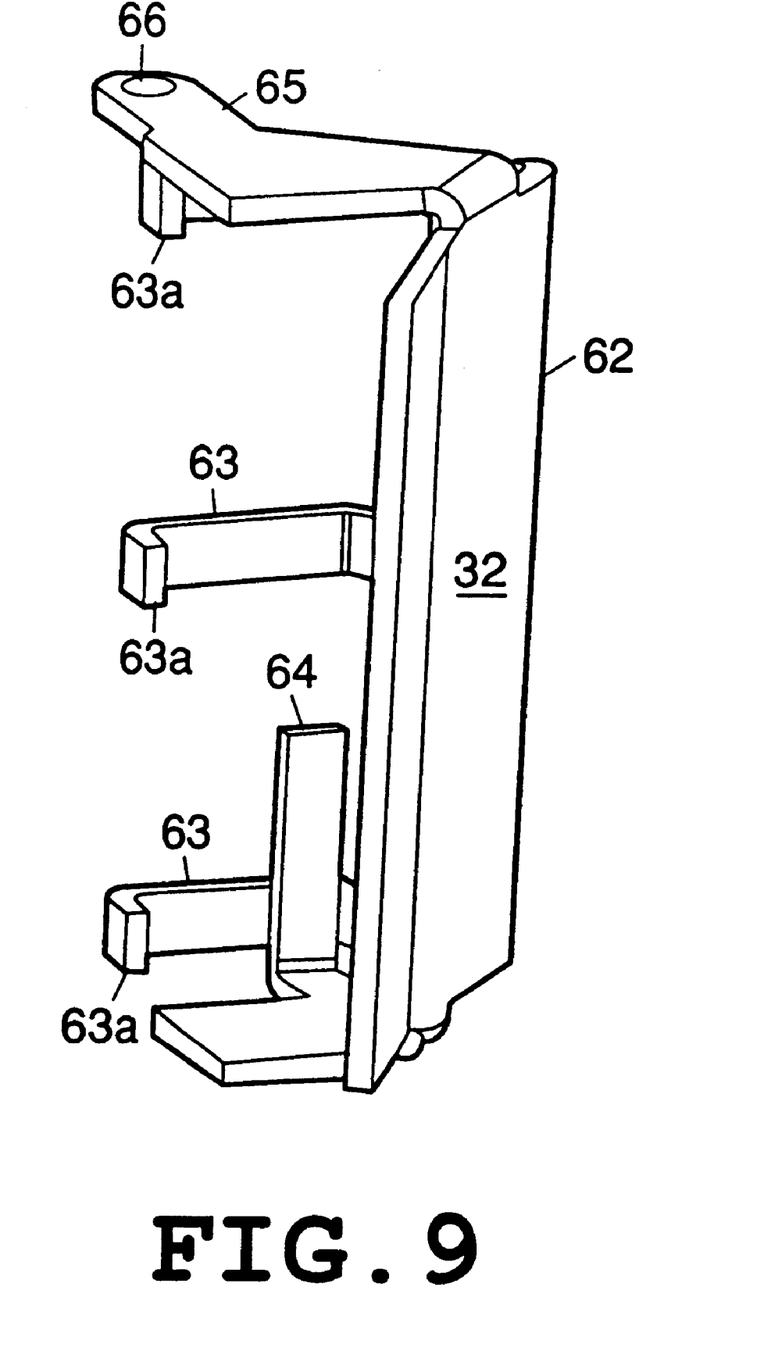
FIG. 9 illustrates the appearance of the filter unit from a viewpoint different from that of FIG. 8.

Referring also to FIG. 9, a retaining member 64 is opposed to the lowest arm 63. The retaining member 64 is formed continuously from the lower end of the rectification wall 32. The retaining member 64 serves to urge the circulation filter 61 upon the arms 63 so as to reliably retain the circulation filter 61.

Referring again to FIG. 8, an attachment member 65 is formed continuously from the upper end of the rectification wall 32 so as to horizontally extend. A circular attachment hole 66 is perforated at the tip of the attachment member 65. When the filter unit 60 is assembled into the corner 30 of the casing body 13, the attachment hole 66 tightly receives a protrusion, not shown, formed on the casing body 13. Accordingly, the filter unit 60 can be reliably positioned relative to the casing body 13.

While the present invention is applied to HDDs in the above-described embodiments, the present invention can be applied to other types of an airtight information recording medium drive apparatus. In addition, rectification walls should be disposed at respective corners of a casing body so as to increase the continuity of a shroud in case of eliminating the disposition of a circulation filter.

What is claimed is:

1. A disk drive comprising:
   at least one disk having a periphery;
   at least one head with respect to said disk;
   a casing enclosing said head and disk and having a side wall facing said periphery;
   a rectification wall disposed at a corner of said casing along the periphery of said disk and defining between said side wall and itself a bypass for an air stream generated by rotation of said disk; and
   a filter dispos ed in s aid bypass; wherein
   a parameter d/L, where d is a width of an entrance of said bypass and L is a length of the corner along the periphery, is determined so that vibration of said disk in rotation is equal to or less than an admissible value estimated from a tracking error margin.

2. The disk drive as defined in claim 1, wherein the parameter d/L is set equal to or less than 0.107.

3. The disk drive as defined in claim 1, wherein a $\frac{1}{10}$ reduction period representative of filtering performance of the filter is considered in determining the parameter d/L.

4. The disk drive as defined in claim 3, wherein the parameter d/L is set between 0.06 and 0.08.

5. The disk drive as defined in claim 1, wherein the rectification wall and filter are assembled as a filter unit before being assembled into the casing.

6. The disk drive as defined in claim 1, wherein the drive is assembled in a computer.

7. A filter unit for a disk drive, said filter unit comprising:
   a support member having an upper and a lower wall, said support member being configured and arranged to be positioned between upper and lower surfaces of a casing of a disk drive;
   a rectification wall of a shape corresponding to a periphery of a disk;
   a bypass defined by said upper and lower walls, said bypass communicating with an air stream generated by rotation of said disk; and
   a filter placed in said bypass through a filter attachment opening perforated in said upper wall of said support member.

8. The filter unit as defined in claim 7, wherein inclined surfaces are formed in said upper and lower walls to define an entrance of said bypass.

9. The filter unit as defined in claim 7, wherein the filter unit is assembled in a computer.

10. A disk drive comprising:

a casing body enclosing at least one disk and at least one head with respect to said disk in an interior space;

a cover member placed on said casing body for closing said interior space;

an elastic member attached to said cover member; and a filter unit fixed between a bottom of said casing body and said cover member by an elastic force from said elastic member when said cover member closes said interior space;

wherein said filter unit includes:
   a support member having an upper and a lower wall;
   a rectification wall facing a periphery of said disk;
   a bypass defined by said upper and lower walls, said bypass communicating with an airstream generated by rotation of said disk; and
   a filter placed in said bypass through a filter attachment opening perforated in said upper wall.

11. A disk drive comprising:

at least one disk having a periphery;

at least one head with respect to said disk;

a casing enclosing said disk and said head;

a filter unit including a support member disposed at a corner of said casing;

a rectification wall formed on said support member so as to face said periphery of said disk;

a bypass defined by said upper and lower walls, said bypass communicating with an airstream generated by rotation of said disk; and a filter placed in said bypass through a filter attachment opening perforated in said upper wall;

wherein a parameter d/L, where d is a width of an entrance of said bypass and L is a length of the corner along the periphery, is determined so that vibration of said disk in rotation is equal to or less than an admissible value estimated from a tracking error margin.

12. The disk drive as defined in claim 11, wherein the parameter d/L is set equal to or less than 0.107.

13. The disk drive as defined in claim 11, wherein a 1/10 reduction period representative of filtering performance of the filter is considered in determining the parameter d/L.

14. The disk drive as defined in claim 13, wherein the parameter d/L is set between 0.06 and 0.08.

* * * * *

UNITED STATES PATENT AND TRADEMARK OFFICE
CERTIFICATE OF CORRECTION

PATENT NO. : 6,008,965
DATED : December 28, 1999
INVENTOR(S) : Izumi et al.

It is certified that error appears in the above-indentified patent and that said Letters Patent is hereby corrected as shown below:

In the Claims:

In claim 1, line 10 please delete "a filter dispos ed in s aid" and insert --a filter disposed in said-- therefor Signed and Sealed this Seventeenth Day of April, 2001

Attest:

NICHOLAS P. GODICI

Attesting Officer      Acting Director of the United States Patent and Trademark Office